(12) United States Patent
Gulick, Jr. et al.

(10) Patent No.: US 9,117,351 B2
(45) Date of Patent: *Aug. 25, 2015

(54) SYSTEM FOR SECURITY AND CHARGING OF HANDHELD ELECTRONIC DEVICES OF DIFFERENT CHARGING VOLTAGES

(76) Inventors: Franklyn W. Gulick, Jr., Binghamton, NY (US); Stefan Henneboele, Frondenberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/240,967

(22) PCT Filed: Aug. 24, 2012

(86) PCT No.: PCT/US2012/052265
§ 371 (c)(1),
(2), (4) Date: Sep. 16, 2014

(87) PCT Pub. No.: WO2013/028971
PCT Pub. Date: Feb. 28, 2013

(65) Prior Publication Data
US 2015/0108948 A1    Apr. 23, 2015

Related U.S. Application Data

(60) Provisional application No. 61/527,364, filed on Aug. 25, 2011.

(51) Int. Cl.
*H02J 7/00* (2006.01)
*G08B 13/14* (2006.01)
*G08B 13/12* (2006.01)
*G06F 21/88* (2013.01)

(52) U.S. Cl.
CPC ............... *G08B 13/14* (2013.01); *G06F 21/88* (2013.01); *G08B 13/1445* (2013.01); *H02J 7/0044* (2013.01); *H02J 7/0052* (2013.01)

(58) Field of Classification Search
CPC ............................ G08B 13/14; G08B 13/1445
USPC ............... 320/115; 340/568.1, 568.2; 109/39; 116/99
See application file for complete search history.

(56) References Cited

U.S. PATENT DOCUMENTS

| 19,622 A | 3/1858 | Clark |
| 242,959 A | 6/1881 | Naglee |

(Continued)

FOREIGN PATENT DOCUMENTS

| EP | 0944148 | 3/1999 |
| JP | 08156945 | 6/1996 |
| WO | WO-2013028971 | 2/2013 |

OTHER PUBLICATIONS

International Search Report and Written Opinion of the International Searching Authority, PCT/US2012/052265; Applicant: Scorpion Security Products, Inc.; Mailed Feb. 5, 2013, 16 pages.

*Primary Examiner* — Richard Isla Rodas
*Assistant Examiner* — David V Henze-Gongola
(74) *Attorney, Agent, or Firm* — Barclay Damon LLP

(57) ABSTRACT

A system for securing and charging handheld electronic devices of different charging voltages is disclosed. The system can include a security device with two charging ports to provide the ability to charge the battery of the handheld electronic device at two different charging voltages. The system can include an alarm activated when the alarm switch is activated or when the charging cable connected to the charging ports or the handheld electronic device is disconnected.

13 Claims, 9 Drawing Sheets

(56) References Cited

U.S. PATENT DOCUMENTS

| | | |
|---|---|---|
| 297,981 A | 5/1884 | Francis |
| 339,072 A | 3/1886 | Nies |
| 351,550 A | 10/1886 | Weller |
| 528,557 A | 11/1894 | Peabody |
| 685,078 A | 10/1901 | Willringhaus |
| 762,070 A | 6/1904 | Longard |
| 774,810 A | 11/1904 | Willis |
| 887,103 A | 5/1908 | Lane |
| 1,075,384 A | 10/1913 | Seidel |
| 1,402,621 A | 1/1922 | Kesslering et al. |
| 1,586,314 A | 5/1926 | Kiefer |
| 1,709,385 A | 4/1929 | Young |
| 2,094,225 A | 9/1937 | Tuttle |
| 2,114,227 A | 4/1938 | Kriss |
| 2,225,273 A | 12/1940 | Jacobs |
| 2,424,871 A | 7/1947 | Wenk et al. |
| 2,552,094 A | 5/1951 | Hamon et al. |
| 2,610,661 A | 9/1952 | Romine |
| 2,716,362 A | 8/1955 | Novak |
| 3,741,517 A | 6/1973 | Pogonowski |
| 3,855,825 A | 12/1974 | Pickard |
| 4,083,547 A | 4/1978 | Gurley |
| 4,234,176 A | 11/1980 | Goff et al. |
| 5,052,199 A | 10/1991 | Derman |
| 5,246,183 A | 9/1993 | Leyden |
| 5,463,688 A | 10/1995 | Wijas |
| 5,555,302 A | 9/1996 | Wang |
| RE35,677 E | 12/1997 | O'Neill |
| 5,697,601 A | 12/1997 | Gurule |
| 5,825,874 A | 10/1998 | Humphreys et al. |
| 5,863,033 A | 1/1999 | Bradford |
| 5,893,553 A | 4/1999 | Pinkous |
| 5,903,645 A | 5/1999 | Tsay |
| 6,000,686 A | 12/1999 | Yates |
| 6,002,921 A | 12/1999 | Pfahlert et al. |
| 6,161,823 A | 12/2000 | Bradford |
| 6,176,479 B1 | 1/2001 | Hicklin |
| 6,199,804 B1 | 3/2001 | Donofrio, Jr. |
| 6,220,589 B1 | 4/2001 | Smith, III et al. |
| 6,237,375 B1 | 5/2001 | Wymer |
| 6,659,382 B2 | 12/2003 | Ryczek |
| 6,690,277 B1 * | 2/2004 | Hansen et al. ............. 340/568.2 |
| 6,848,662 B2 | 2/2005 | Paramonoff et al. |
| 7,111,764 B2 | 9/2006 | Smith et al. |
| 7,197,962 B2 | 4/2007 | Williams |
| 2003/0106971 A1 | 6/2003 | Leyden et al. |
| 2004/0231376 A1 * | 11/2004 | Leyden et al. .................... 70/58 |
| 2004/0261473 A1 | 12/2004 | Avganim |
| 2005/0001485 A1 * | 1/2005 | Pail ................................ 307/75 |
| 2005/0028571 A1 | 2/2005 | Merrem et al. |
| 2007/0157495 A1 | 7/2007 | Yang |
| 2008/0186686 A1 | 8/2008 | Buck et al. |
| 2009/0079566 A1 | 3/2009 | Goldstein et al. |
| 2010/0194568 A1 | 8/2010 | Irmscher et al. |
| 2013/0318639 A1 * | 11/2013 | Gulick, Jr. ...................... 726/35 |

* cited by examiner

SYSTEM FOR SECURITY AND CHARGING OF HANDHELD ELECTRONIC DEVICES OF DIFFERENT CHARGING VOLTAGES

CROSS-REFERENCE TO RELATED APPLICATIONS

This application claims priority from, and is a national stage application pursuant to 35 U.S.C. §371 of, PCT Application No. PCT/US2012/052265, filed Aug. 24, 2012, and entitled System for Security and Charging of Handheld Electronic Devices of Different Charging Voltages, the entire contents of which is herein incorporated by reference. PCT Application No. PCT/US2012/052265 claims priority from U.S. Provisional Patent Application Ser. No. 61/527,364, filed Aug. 25, 2011, the entire contents of which is herein incorporated by reference.

FIELD OF THE INVENTION

The invention relates to a security system tor allowing functional display and charging of handheld electronic devices, including handheld electronic devices of different charging voltages.

BACKGROUND OF THE INVENTION

Retailers sell handheld electronic devices to the public in a range of shapes and sizes, with a range of functionality. Encouraging customers to pick up, hold, examine, and use the functionality of the devices at display locations is a valuable marketing technique employed by retailers. To decrease the risk of theft associated with this marketing strategy, retailers employ various security measures.

One common security measure is the use of an alarm switch that sets (e.g., closes) when placed in contact with the surface of the handheld electronic device and activates (e.g., opens) when it loses contact with the device (e.g., when the alarm switch is removed). A typical, alarm switch is attached to one portion of the handheld electronic device using an adhesive tape or similar adhesive product. During use, the adhesives often fail, resulting in the alarm switch losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm witches are only activated when the alarm switch loses contact with the portion of the handheld electronic devices to which it has been attached. For example, if the alarm switch is attached to tile battery cover of a wireless phone, a thief can remove and steal the remainder of the wireless phone (i.e., all components but the battery cover) without activating the alarm switch. In order to combat this, retailers often install a plurality of alarm switches in multiple locations on the handheld electronic devices (e.g., front and back, inside the battery compartment, etc.). These alarm switches often hinder customer inspection of the device. In some cases, these alarm switches installed within the handheld electronic devices can ignite when subjected to excessive heat within the devices.

In addition to preventing theft of handheld electronic devices, in order to ensure that the devices on display are functional, retailers need to provide charging of the devices on a regular basis so that customers can operate the devices. In many instances, this charging requirement is provided by a separate charging device that can also hinder access to the handheld electronic device and present a visually unappealing display.

Many retail stores display handheld electronic devices having different charging voltage requirements. For example, while a wireless phone may require 5V for charging, an electronic tablet may require 12V for charging. In existing security systems, devices charged at a first charging voltage (e.g., 5V) require a first type of security device configured to charge that first charging voltage with those first devices attached to one or more main terminals configured to provide the power to those first types of security devices. Devices charged at a second charging voltage (e.g., 12V) require a second, type of security device configured to charge that second charging voltage with those second devices attached to one or more main terminals configured to provide the power to those second types of security devices. In many cases, the presence of handheld electronic devices having different charging voltages can increase the complexity and costs of a security system while decreasing the flexibility of that system.

The discussion above is merely provided for a general, background information and is not intended to foe used as an aid in determining the scope of the claimed subject matter.

SUMMARY OF THE INVENTION

A system for securing and charging handheld electronic devices of different charging voltages is disclosed. The system can include a security device with two charging ports to provide the ability to charge the battery of the handheld electronic device at two different charging voltages. The system can include an alarm activated when the alarm switch is activated or when the charging cable connected to the charging ports or the handheld electronic device is disconnected. An advantage that may be realized in the practice of some disclosed embodiments is that the same security device and system can be used to secure and charge handheld electronic devices having different charging voltages.

In one embodiment, a system for securing and charging handheld electronic devices of different charging voltages is disclosed. The system comprises a security device comprising an alarm switch configured to set when placed in contact with a surface of a handheld electronic device and to activate when the alarm switch loses contact with the handheld electronic device, a first charging port for charging the handheld electronic device at a first charging voltage, and a second charging port for charging the handheld electronic device at a second charging voltage, wherein the first charging voltage is lower than the second charging voltage.

In another embodiment, the system comprises a main terminal comprising a first charging voltage bus for providing a first charging voltage, a second charging voltage bus for providing a second charging voltage, and a microprocessor for monitoring an alarm switch.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Different parts are indicated with different numerals. Thus, for further understanding of the invention, reference can be made to the following detailed description, read in connection with the drawings in which.

DETAILED DESCRIPTION OF THE INVENTION

Figure 1:
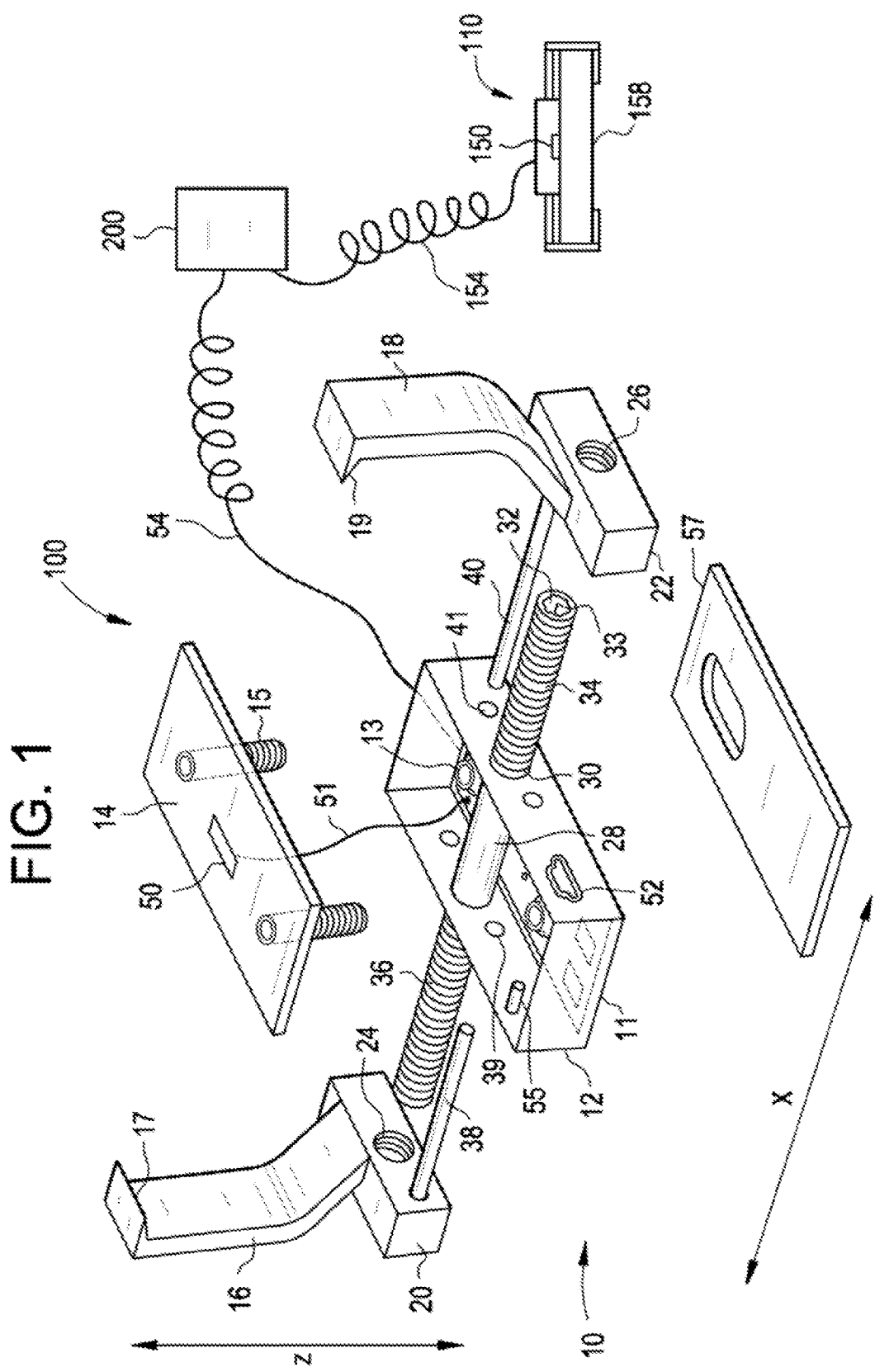
FIG. 1 is an exploded perspective view of an exemplary embodiment of a security system including a security device.
Figure 2:
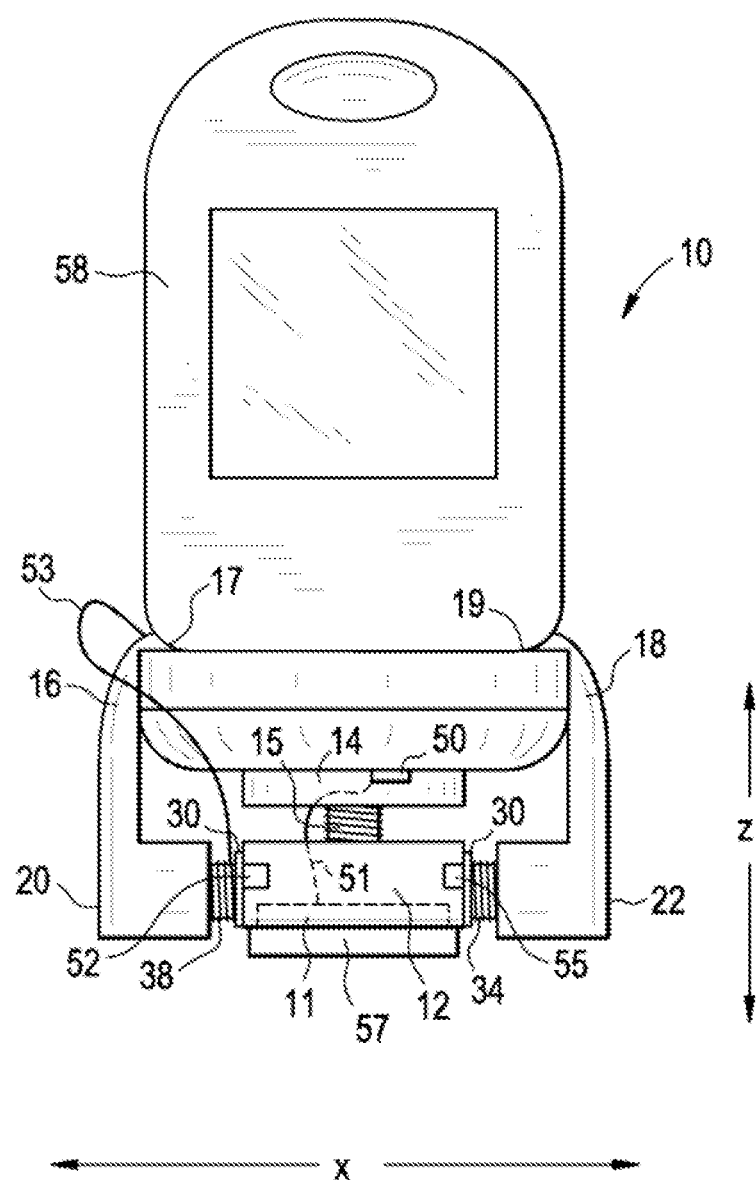
FIG. 2 is a front view of the exemplary embodiment of a security device of FIG. 1.

FIG. 1 is an exploded perspective view of an exemplary embodiment of a security system 100, including a security device 10 for functional display, security, and charging of a handheld electronic device (not shown). FIG. 2 is a front view of the exemplary embodiment of a security device 10 of FIG. 1. The security device 10 comprises a housing body 12, a moveable leveling plate 14 proximate to the upper surface (not shown in FIG. 1) of the housing body 12, a first moveable arm 16 extending upwardly from a first arm base 20 proximate to the first side of the housing body 12, and a second moveable arm 18 extending upwardly from the second side of the housing body 12. Leveling plate 14 moves vertically in alignment with the Z axis between the first moveable arm 16 and the second moveable arm 18. First moveable arm 16 and second moveable arm 18 move horizontally in alignment with the X axis. The first moveable arm 16 includes a first arm base 20 at its proximal end and has a first retention hook 17 extending substantially horizontally from the distal end of the first moveable arm 16 above the plane of the upper surface of the housing body 12. The second moveable arm 18 includes a second arm base 22 at its proximal end and has a second retention hook 19 extending substantially horizontally from the distal end of the second moveable arm 18 above the plane of the upper surface of the housing body 12.

The horizontal movement (i.e., extending and retracting) of first moveable arm 16 and second moveable arm 18 along the X axis is controlled by the rotation of draw pin 28, which extends through the first side and the second side of the housing body 12 and includes two threaded ends 34, 36, each of which is machined with a thread pattern that is counter rotational to the other. Correspondingly, threaded hole 24 in first arm base 20 and threaded hole 26 in second arm base 22 are each machined with a thread pattern that is counter rotational to the other. In operation, threaded end 36 is complementary to and inserted in threaded hole 24, while threaded end 34 is complementary to and inserted in threaded hole 26. The draw pin 28 is held in place by lock washers 30, which are attached at opposing end portions of draw pin 28 and so positioned to abut the side walls of the housing body 12.

Figure 7:
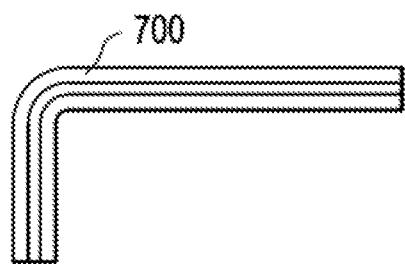
FIG. 7 is a plan view of an exemplary hex tool according to an exemplary embodiment of the invention.
Figure 8:
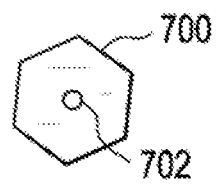
FIG. 8 is an end view of the exemplary hex tool shown in FIG. 7.

The rotation of draw pin 28 is controlled by inserting a suitable tool into hex key hole 32 at the tip of threaded end 34 of draw pin 28. Disposed with hex key hole 32 is a security pin 33 that can be turned by a tool. FIG. 7 is a plan view of a tool 700 according to an exemplary embodiment of the invention. Tool 700 can comprise a hex wrench for engaging hex key hole 32 of draw pin 28. FIG. 8 is an end view of tool 700 shown in FIG. 7. As shown in FIG. 8, tool 700 can have a drilled aperture 702 to receive and surround the security pin 33. Returning to FIGS. 1 and 2, when the hex tool 700 is inserted and rotated clockwise, draw pin 28 is simultaneously rotated in a clockwise direction. This screws the opposing threaded ends 34 and 36 into threaded holes 26 and 24, respectively, which serves to move first moveable arm 16 and second moveable arm 18 towards one another, and retracting towards the center of the housing body 12. Conversely, when draw pin 28 is rotated in a counter clockwise direction, first moveable arm 16 and second moveable arm 18 are moved away from each other, and extending away from the center of the housing body 12. In this fashion, first moveable arm 16 and second moveable arm 18, as well as retention hooks 17 and 19, can be infinitely adjusted to clamp onto and securely hold the sides and top edges of a handheld electronic device 58. Although shown as a cell phone in the exemplary embodiment, it will be understood the security device can be used for a variety of handheld electronic devices, such as wireless phones, personal digital assistants (PDAs), radios, scanners, pagers, GPS systems, multimeters, cameras, music players, power tools, calculators, handheld computers such as netbooks, notebooks, laptops, electronic tablets, and electronic readers, and other similar handheld electronic devices.

Figure 3:
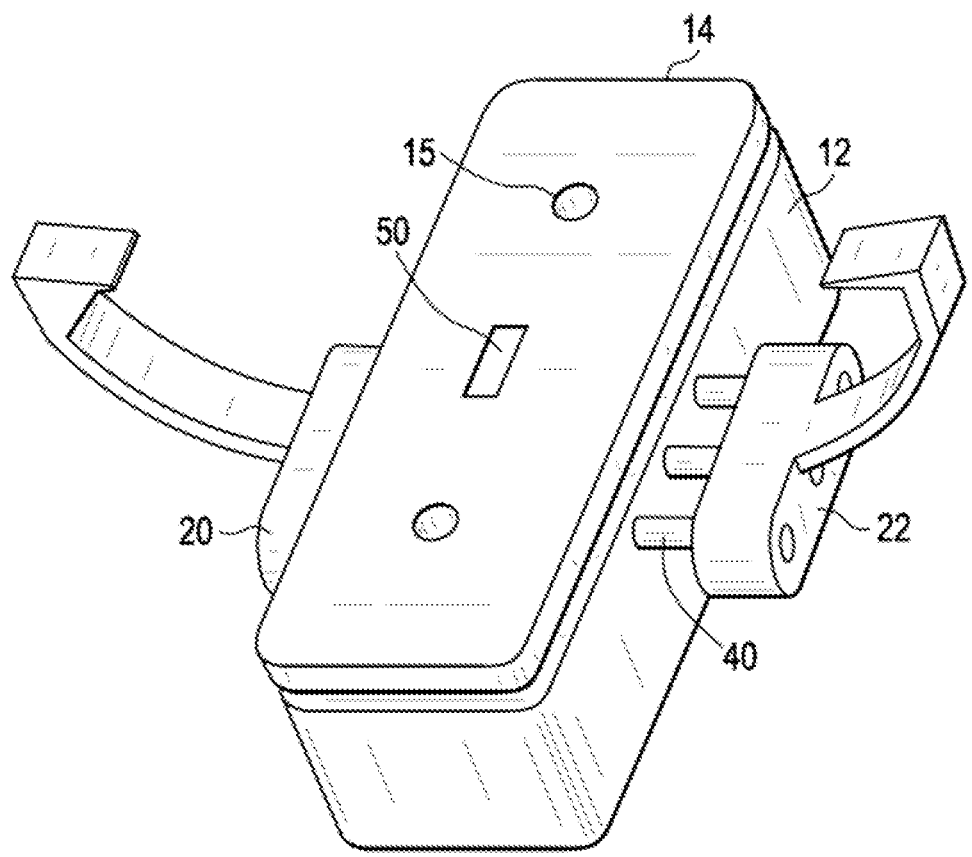
FIG. 3 is a perspective view of another exemplary embodiment of a security device.
Figure 4:
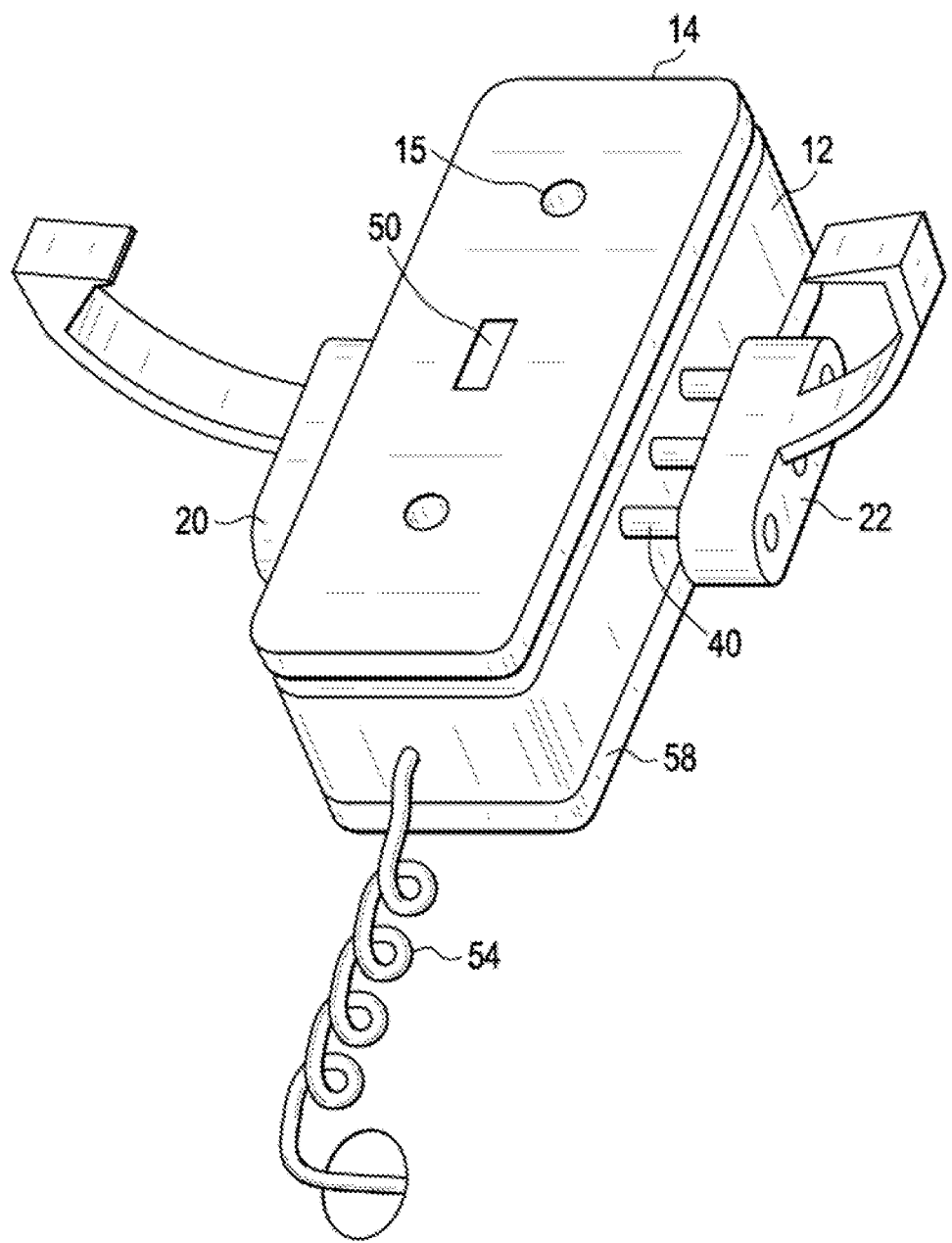
FIG. 4 is a perspective view of another exemplary embodiment of a security device.

Locator pins 38 and 40 are fixedly attached to arm bases 20 and 22, respectively. Locator pin 38 extends through locator hole 39; locator pin 40 extends through locator hole 41. Each pin 38, 40 is parallel to the axis of draw pin 28, and in the same plane thereof. As draw pin 28 is rotated, thereby moving first moveable arm 16 and second moveable arm 18 into a wider or narrower adjustment state, locater pins 38 and 40 slide correspondingly through locator holes 39 and 41. Locator pins 38 and 40 function as stabilizer means to prevent arm bases 20 and 22 from deviating from their fixed alignment, which in turn maintains the perpendicular alignment of first moveable arm 16 and second moveable arm 18 as they move through various states of adjustment as described above. While the exemplary embodiment shown in FIGS. 1 and 2 has one locator pin 38, 40 per arm base 20, 22, as shown in another exemplary embodiment shown in FIG. 3, each arm base 20 and 22 can have multiple locator pins 40.

Returning to FIGS. 1 and 2, the vertical movement of leveling plate 14 along the Z axis is controlled by the rotation of one or more threaded leveling screws 15, which are fixedly attached to the leveling plate 14. Here, it is important to note that while leveling screws 15 are fixedly attached to leveling plate 14, leveling screws 15 are attached in a manner that allows the full and unencumbered rotation of threaded leveling screws 15 in both clockwise and counter clockwise directions. When leveling screws 15 are rotated clockwise into threaded boles 13, leveling screws 15 rise along the threads of threaded holes 13 in the housing body 12, thereby elevating the end of leveling screws 15 that are fixedly attached to leveling plate 14. The threaded holes 13 are built up on the bottom of the housing body 12 to accept the leveling screws 15. In this manner, leveling plate 14 may be elevated in a gradual and controlled manner above the upper surface of the housing body 12. Conversely, when threaded leveling screws 15 are rotated in a counter-clockwise direction, leveling plate 14 is lowered along the threads of threaded holes 13 in a likewise gradual and controlled manner. Each end of leveling plate 14 may be raised or lowered, by alternate turn in graduated increments, thereby raising or lowering plate 14 in a level manner. This allows leveling plate 14 to function substantially as a screw type jack to elevate handheld electronic device 58 and press it securely against retention hooks 17 and 19, thereby holding the device 58 fixedly between leveling plate 14 and retention hooks 17, 19. In another embodiment, the leveling plate 14 can be raised and lowered using one leveling screw 15.

Figure 5:
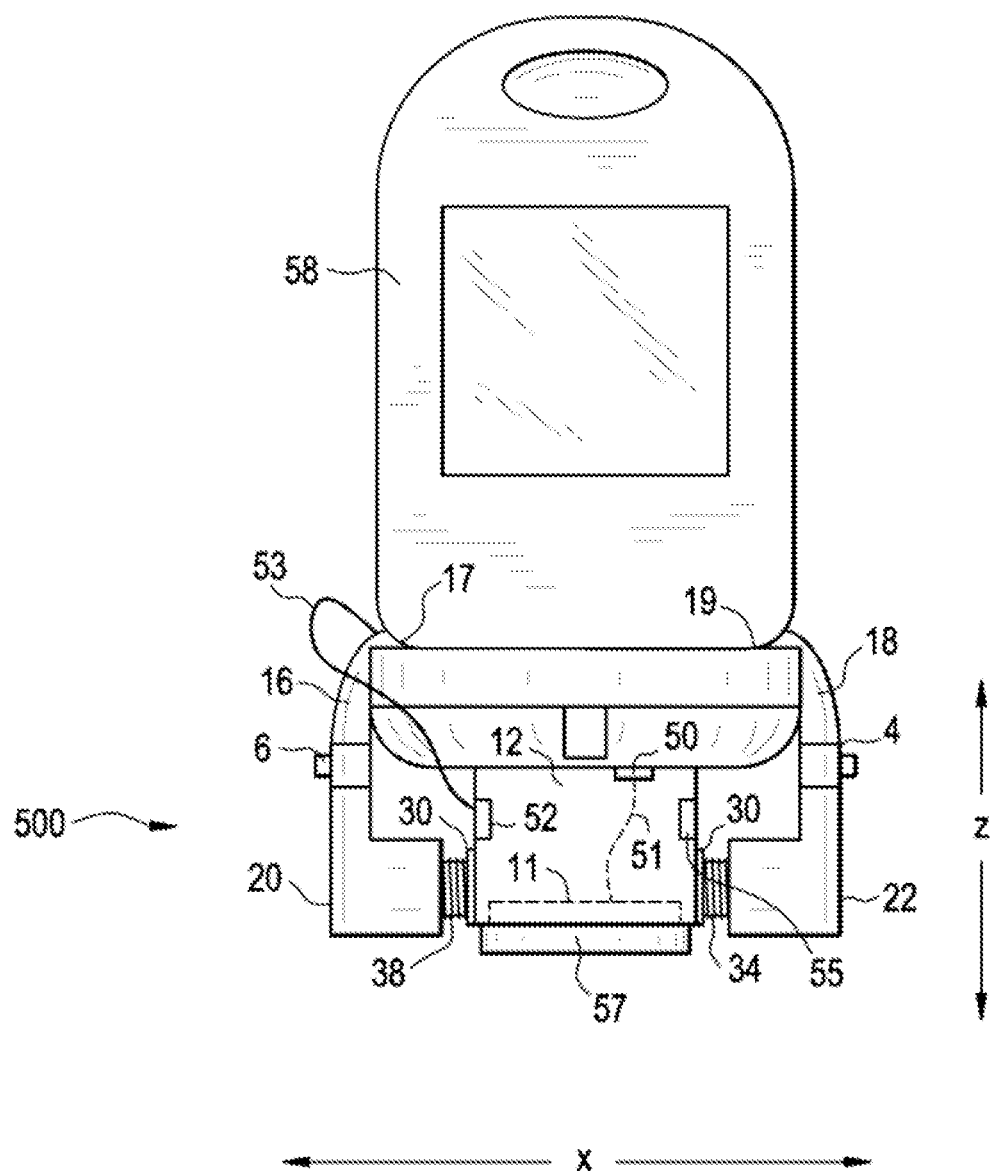
FIG. 5 is a front view of another exemplary embodiment of a security device.

FIG. 5 is a front view of another exemplary embodiment of a security device 500. As compared with the security device 10 of FIGS. 1 through 4, which secures the handheld electronic device 58 by adjusting the height of the leveling plate 14, the exemplary embodiment of the security device 500 in FIG. 6 secures the handheld electronic device 58 by adjusting the height along the z-axis of the and retention hooks 17, 19. In one embodiment, the position of the first retention hook 17 of first moveable arm 16 can be changed to secure the handheld electronic device 58 by using a set screw 6, while the position of the second retention hook 19 of second moveable arm 18 can be changed to secure the handheld electronic device 58 by using a set screw 4.

As shown in FIGS. 1, 2, and 5, the housing body 12 of the security device 10 can also incorporate two charging ports (first charging voltage charging port 52 and second charging voltage charging port 55). The first charging voltage charging port 52 can be used to charge a handheld electronic device at a first charging voltage (e.g. 5V through a Mini USB port), while the second charging voltage charging port 55 can be used to charge a handheld electronic device at a second charging voltage (e.g., 12V through an 2.5 mm audio jack). It will be understood that the invention can be used with a variety of different charging voltages and ports and is not limited to the exemplary charging voltages or ports. As shown in FIGS. 2 and 5, a charging cable 53 between the handheld electronic device 58 and the charging ports 52, 55 can be used to charge the battery of the handheld electronic device 58 regardless of whether the device requires the first charging voltage or the second charging voltage. The two charging ports 52, 55 allow the same security device 10 and system 100 to be used to secure and charge handheld electronic devices 58, 158 having different charging voltages.

As shown in FIGS. 1, 2, 4, and 5, in one embodiment, the bottom surface of the housing body 12 can be inserted into mount 57, where if is detachably attached allowing a customer to inspect and use the handheld electronic device 58.

While the features of the security device 10 described above provide sufficient security against removing the handheld electronic device 58 from the security device 10, retailers often want additional security and functionality from their display devices. For example, if a tether or cord holding the security device 10 were cut, absent other security features, a thief may be able to remove handheld electronic device 58 perhaps without the knowledge of the retailer. To provide additional security, in one embodiment of the invention as shown in FIGS. 1 through 5, an alarm switch 50 is provided on the leveling plate 14 that is configured to set (e.g., close) when placed in contact with a surface of the handheld electronic device 58 and to activate (e.g., open) when the alarm switch 50 loses contact with the device 58 or is otherwise tampered with. A number of different types of alarm switches 50 can be used, such as a tape-style or a plunger-style sensor. In one embodiment, the alarm switch 50 is integrated with and at least partially recessed in the leveling plate 14. A cable 51 (e.g., containing two wires) can connect the alarm switch 50 to a printed circuit board (PCB) 11 located in the housing body 12. The cable 51 should be long enough to allow the leveling plate 14 to move vertically as required. As used herein, the term "connected" used, with respect to two devices, components, or locations in an electrical circuit will be understood to mean that the devices, components, or locations are electrically connected, either directly or indirectly.

Unlike existing alarm switches that are attached to the handheld electronic device using adhesive tape or similar adhesive product, since the alarm switch 50 remains in contact with the handheld electronic device 58 by virtue of the device 58 fixedly held between leveling plate 14 and retention hooks 17, 19, the potential for a false alarm is minimized or eliminated completely. Furthermore, unlike existing alarm switches that only secure one part of a handheld electronic device or that must be used in multiple locations on the same handheld electronic device hindering access and functionality, a single alarm switch 50 can be used to secure the entire handheld electronic device 58 by virtue of the device 58 being fixedly held between leveling plate 14 and retention hooks 17, 19.

Figure 6:
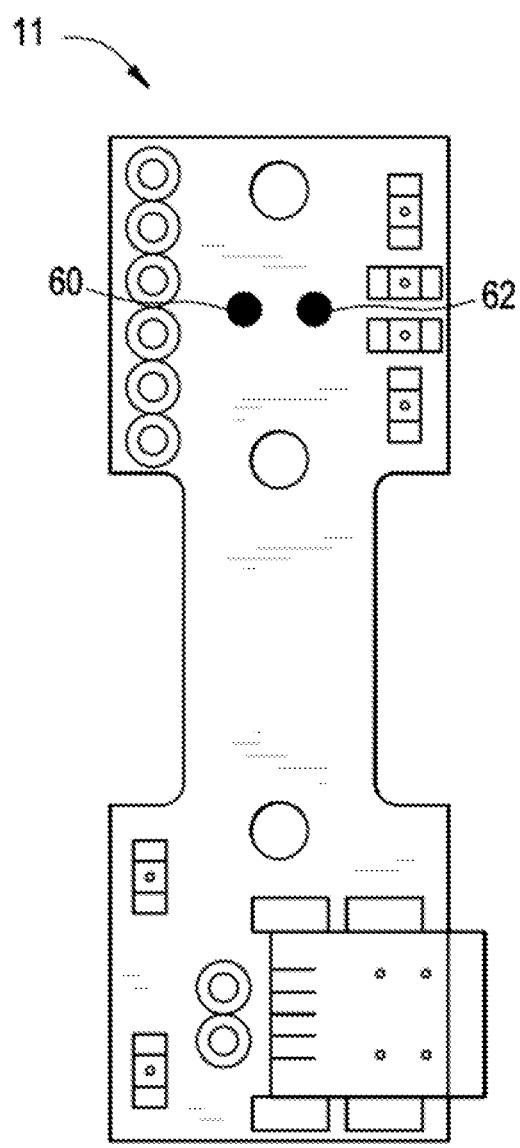
FIG. 6 is an exemplary embodiment of a printed circuit board.

FIG. 6 is an exemplary embodiment of a PCB 11. In one embodiment, the PCB 11 of the security device 10 can include one LED 60 for indicating an alarm condition in one color (e.g., flashing red) and another LED 62 for indicating a normal condition in another color (e.g., solid blue), which can be visible through a transparent housing body 12. In another embodiment, a single LED can be used to provide both colors and conditions.

Figure 9:
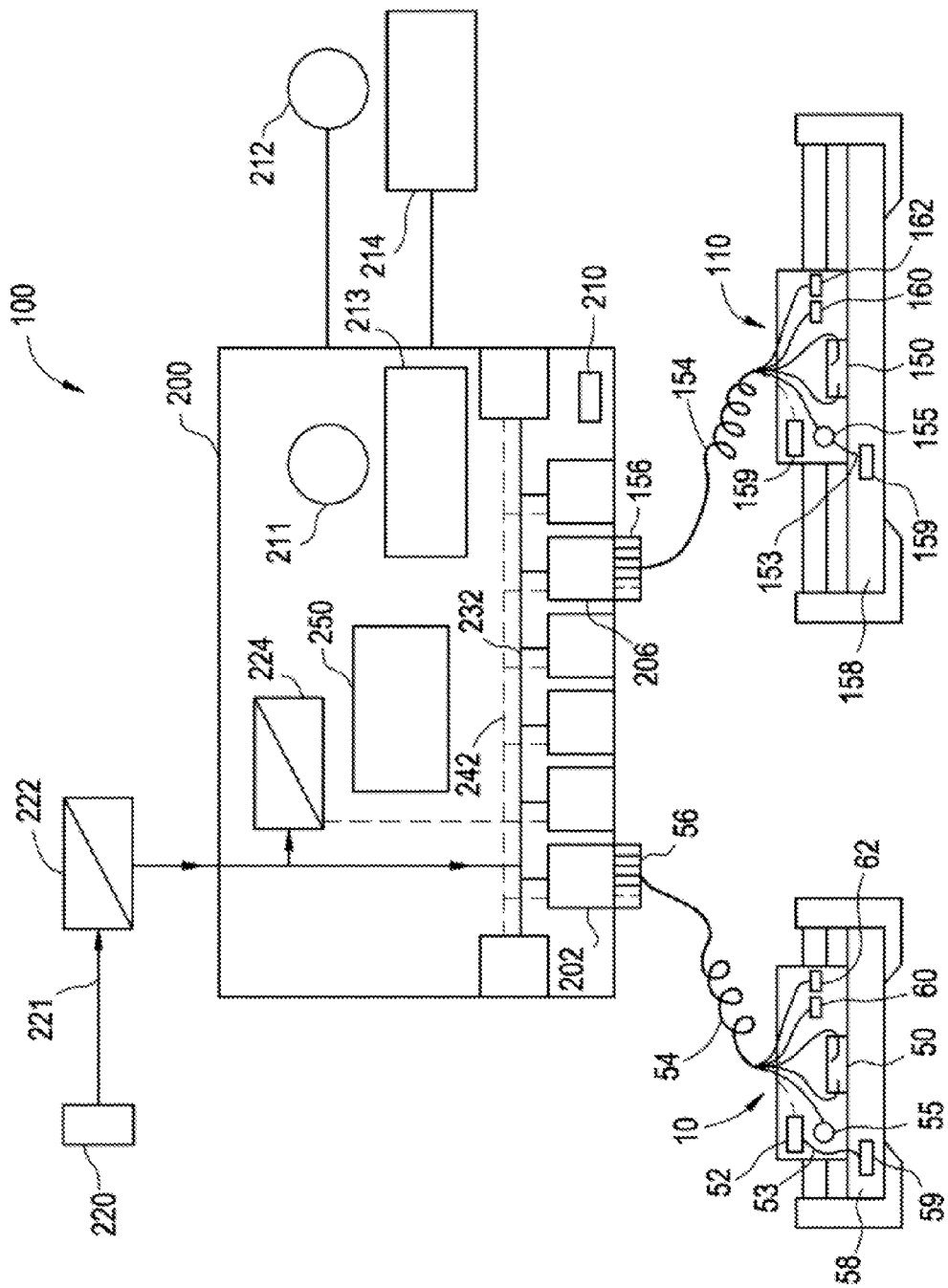
FIG. 9 is a block diagram of an exemplary main terminal.

As shown in FIGS. 1 and 9, a microprocessor 250 in the main terminal 200 can monitor the status (e.g., open or closed) of the alarm switches 50, 150 of a plurality of security devices (first security devise 10 and second security device 110) securing a plurality of handheld electronic devices (first handheld electronic device 58 and second handheld electronic device 158) and activate an alarm (visual and/or audible) when an alarm switch (first alarm switch 50 and/or second alarm switch 150) is activated. The alarm can also activate when the cables (first cable 54 and second cable 154) attached between security devices 10, 110 and the main terminal 200 are cut or disconnected, which has the same effect as the alarm switches 50, 150 opening. The cables 54, 154 include wiring from the ports (first port 202 and second 206) of the main terminal 200 to the security devices 10, 110 for the alarm switches 50, 150 and the LEDs (first alarm condition LED 60, first normal condition LED 62, second alarm condition LED 160, and second normal condition LED 162). This wiring connects the microprocessor 250 of the main terminal 200 to monitor the alarm switches 50, 150 and drive the normal condition LEDs 62, 162 (e.g., blue) and the alarm condition LEDs (60, 160) (e.g., red). In one embodiment, one end of the cables 54, 154 is attached to the PCB 11 (FIGS. 1, 5) of the security devices 10, 110 and the other end is terminated on a jack (e.g., RJ45 jack) (first jack 56 and second jack 156) that plugs into the ports 202, 206 of the main terminal 200. The ports 202, 206 are connected to the microprocessor 250 and other components within the main terminal 200.

The security system 100 can be designed to activate an alarm at the security device 10, 110 (e.g., LEDs 60, 160) and/or the main terminal 200 (e.g., using an onboard siren or buzzer 211 or external siren or buzzer 212 or LEDs). The main terminal 200 can produce different toned or flashing alarms if more than one security device 10, 110 is in an alarm condition. The main terminal 200 can include an internal RF reader or internal RFID antenna 213 or external RF reader or internal RFID antenna 214 for communicating with security cards or similar devices to program devices or silence alarms. The main terminal 200 can have a tamper alarm to activate an audible alarm if the housing of the main terminal 200 is opened, thereby opening a housing alarm switch 210. The main terminal 200 can also have a battery backup in the event that power is removed from the main terminal 200 to be able to continue to monitor the security devices 10 110 and activate audible alarms. Residual voltage in the security devices 10, 110 may also enable an audible alarm in the security device 10, 110 to continue to sound for a few minutes after the cables 54, 154 are disconnected.

As shown in FIG. 1, the main terminal 200 can simultaneously provide charging power at a first charging voltage through wiring in the first cable 54 connecting a first port 202 of the main terminal 200 to the first charging voltage charging port 52 of the first security device 10, as well as charging power at a second charging voltage through wiring in the first cable 54 connecting the first port 202 of the main terminal 200 to the second charging voltage charging port 52 of the first security device 10. This enables the first security device 10 to provide both a first charging voltage and a second charging voltage to the first handheld electronic device 58. In the example of FIG. 9, the first input charging port 59 of the first handheld electronic device 58 connects to the first charging voltage charging port 52 using a first charging cable 53 and its battery is charged at the first charging voltage.

Similarly, the main terminal 200 can simultaneously provide charging power at a first charging voltage through wiring in the second cable 154 connecting a second port 206 of the main terminal 200 to the first charging voltage charging port 152 of the second security device 110, as well as charging power at a second charging voltage through wiring in the second cable 154 connecting the second port 206 of the main terminal 200 to the second charging voltage charging port 155 of the second security device 10. This enables the second security device 110 to provide both a first charging voltage and a second charging voltage to the second handheld electronic device 158. In the example of FIG. 9, the second input charging port 159 of the second handheld electronic device 158 connects to the second charging voltage charging port 155 using a second charging cable 153 and its battery is charged at the second charging voltage.

In one embodiment, the main terminal 200 includes a first charging voltage bus 242 and a second charging voltages bus 232. Each port 202, 206 can be connected to each of the charging voltage buses 232, 242 for connecting to wiring in the cables 54, 154. In one embodiment, a wall outlet 220 providing alternating current (AC) voltage (e.g., 110V/220V) is connected to an AC/DC (direct current) converter 222 to output a DC voltage. Although shown external to the main terminal 200, it will be understood that the AC/DC converter 222 can be provided internal to the main terminal 200.

In one embodiment, the output of the AC/DC converter 222 is at the second charging voltage, although a higher or lower voltage can be used. The output of the AC/DC converter 222 is then input to a DC/DC converter 224 that outputs the first charging voltage. If the output of the AC/DC converter was a voltage other than the second charging voltage, the DC/DC converter 224 could also be used to output the second charging voltage. The outputs of the AC/DC converter 222 and/or the DC/DC converter 224 are then connected to the respective charging voltage buses 232, 242. This enables the main terminal 200 to provide both a first charging voltage and a second charging voltage to the security devices 10, 110.

Figure 10:
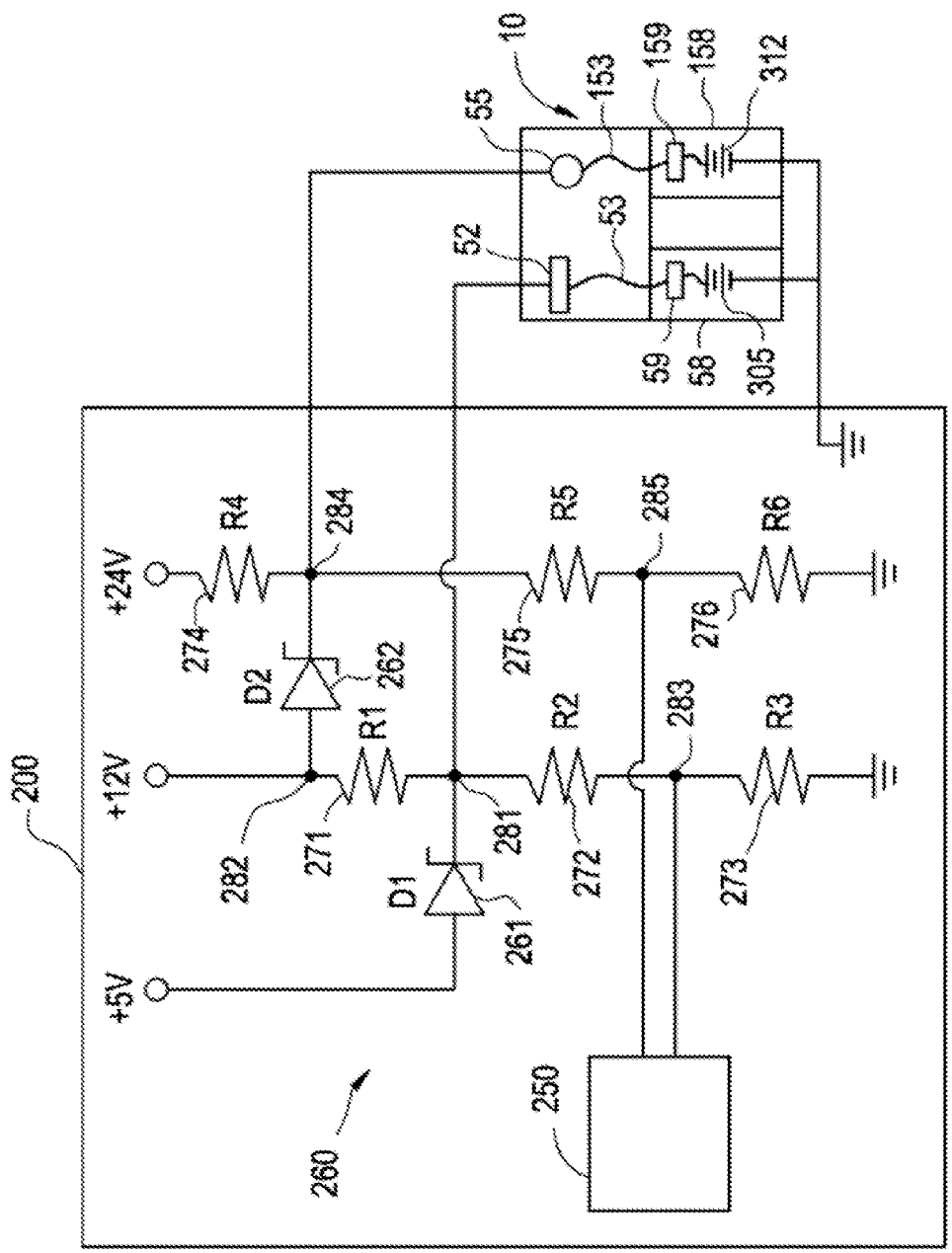
FIG. 10 is a schematic diagram of an exemplary alarm circuit for detecting the disconnection of a charging cable.

In addition to detecting when an alarm switch 50, 150 has been activated or when a cable 54, 154 has been cut, the security system 100 can also detect when the charging cables 53, 153 have been disconnected from either the charging ports 52, 55, 152, 155 of the security devices 10, 110 or from the input charging ports 59, 159 of the handheld electronic devices 58, 158. FIG. 10 is a schematic diagram of an exemplary alarm circuit 260 for detecting the disconnection of a charging cable 53, 153.

As previously shown in FIG. 9, FIG. 10 Illustrates a first security device 110 with a first charging voltage charging port 52 and a second charging voltage charging port 55. Although only one handheld electronic device 58, 158 would be installed on the first security device 10, for illustration purposes, the first battery 305 of first handheld electronic device 58 is shown connected via its first input charging port 59 to the first charging voltage charging port 52 via the first charging cable 53, and the second battery 312 of second handheld electronic device 158 is shown connected via its second input charging port 159 to the second charging voltage charging port 55 via the second charging cable 153. As will be explained, the microprocessor 250 of the main terminal 200 monitors the voltage at the third node 283 and the fifth node 285 in the alarm circuit 260 to determine if a charging cable 53, 153 has been disconnected, and, if so, activates an alarm. The voltage at the third node 283 is determined as a function of a voltage divider of a second resistor (R2) 272 and a third resistor (R3) 273. The voltage at the fifth node is determined a function of a voltage divider of a fifth resistor (R5) 275 and a sixth resistor (R6) 276.

In one embodiment of the alarm circuit 260, the first charging voltage (e.g., 5V) is connected to a first node 281 through a first diode (D1) 261 (e.g., a Schottky diode), with the anode of the first diode (D1) 261 connected to the first charging voltage and the cathode of the first diode (D1) 261 connected to the first node 281. The first node 281 is connected to the first charging voltage charging port 52 of the first security device 10. The second charging voltage (e.g., 12V) (or a second voltage higher than the first charging voltage) is connected to a second node 282, which is connected to the first node 281 through a first resistor (R1) 271 having a resistance value (e.g., 1 megaohm) significantly greater than the impedance or resistance of the first battery 305 when connected. Due to the resistance of the first resistor (R1) 271 being much higher than impedance or resistance of the first battery 305 when connected, the majority of the second charging voltage (or a second voltage higher than the first charging voltage) is dropped across the first resistor (R1) 271 when the first battery 305 is connected. The first diode (D1) 261 prevents current from flowing from the second charging voltage to the first charging voltage.

The first node 281 is also connected to the third node 283 through the second resistor (R2) 272 (e.g., 2.2 megaohms). The third node 283 is connected to ground through the third resistor (R3) 273 (e.g., 2.2 megaohms). The third node 283 is also connected to the microprocessor 250, which can monitor the voltage at the third node 283 to determine if the first charging cable 53 is connected or has been disconnected.

For example, when the first charging cable 53 is connected to the first battery 305, the voltage at the first node 281 is slightly lower than the first charging voltage (e.g., lower by the forward voltage of first diode (D1) 261), producing a First connected test voltage at the third node 283. When the first charging cable 53 is not connected or disconnected, the voltage at the first node 281 is higher than the first charging voltage, producing a first unconnected test voltage at the third node 283, wherein, the first unconnected test voltage is higher than the first connected test voltage. Accordingly, if the microprocessor 250 determines that the voltage at the third node 283 increases (e.g., above a first threshold voltage) as caused by the disconnection of the first charging cable 53 from either the first charging voltage charging port 52 or front the first input charging port 59 of the first handheld electronic device 58, an alarm can be activated.

As discussed above, the second charging voltage (e.g., 12V) is connected to the second node 282. The second node 282 is connected to a fourth node 284 through a second diode (D2) 262 (e.g., a Schottky diode), with the anode of the second diode (D2) 262 connected to the second node 282 and the cathode of the second diode (D2) 262 connected to the fourth node 284. The fourth node 284 is connected to the second charging voltage charging port 55 of the first security device 10. A third voltage (e.g., 24V) higher than the second charging voltage is connected to the fourth node 284 through a fourth resistor (R4) 274 having a resistance value (e.g., 1 megaohm) significantly greater than the impedance or resistance of the second battery 312 when connected. The third voltage can be obtained by inputting the second charging voltage into a booster circuit on in the main-terminal 200. Due to the resistance of the fourth resistor (R4) 274 being much higher than impedance or resistance of the second battery 312 when connected, the majority of the third voltage is dropped across the fourth resistor (R4) 274 when the second battery 312 is connected. The second diode (D2) 262 prevents current from flowing from the third voltage to the second charging voltage.

The fourth node 282 is also connected to the fifth node 285 through the fifth resistor (R5) 275 (e.g., 4.7 megaohms). The fifth node 285 is connected to ground through the sixth resistor (R6) 276 (e.g., 1 megaohm). The fifth node 285 is also connected to the microprocessor 250, which can monitor the voltage at the fifth node 285 to determine if the second charging cable 153 is connected or has been disconnected.

For example, when the second charging cable 153 is connected to the second battery 312, the voltage at the fourth node 284 is slightly lower than the second charging voltage (e.g., lower by the forward voltage of second diode (D2) 262), producing a second connected test voltage at the fifth node 285. When the second charging cable 153 is not connected or disconnected, the voltage at the fourth node 284 is higher than the second charging voltage, producing a second unconnected test voltage at the fifth node 285, wherein the second unconnected test voltage is higher than the second connected test voltage. Accordingly, if the microprocessor 250 determines that the voltage at the fifth node 285 increases (e.g., above a second threshold voltage) as caused by the disconnection of the second charging cable 153 from either the second charging voltage charging port 55 or from the second input charging port 150 of the second handheld electronic device 158, an alarm can be activated.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements it will be understood that the exemplary embodiments can be practiced utilizing either less than or more than the certain number of elements.

What is claimed is:

1. A system for securing and charging handheld electronic devices of different charging voltages, the system comprising:
    a security device comprising
        an alarm switch configured to set when placed in contact with a surface of a handheld electronic device and to activate when the alarm switch loses contact with the handheld electronic device;
        a first charging port for charging the handheld electronic device at a first charging voltage;
        a second charging port for charging the handheld electronic device at a second charging voltage, wherein the first charging voltage is lower than the second charging voltage
        a body having a first side, a second side, and an upper surface;
        a first arm extending upwardly from the first side of the body and having at distal end, wherein the distal end of the first arm has a first retention hook extending substantially horizontally from the distal end of the first arm above the plane of the upper surface of the body;
        a second arm extending upwardly from the second side of the body and having a distal end, wherein the distal end of the second arm has a second retention hook extending substantially horizontally from the distal end of the second arm above the plane of the upper surface of the body;
        a draw pin extending through the first side and the second side of the housing body for moving the first arm and second arm simultaneously along an X-axis relative to the first side and the second side of the body, wherein the draw pin comprises a first threaded end and second threaded end, wherein the first threaded end has a thread pattern that is counter rotational to the thread pattern of the second threaded end; and
        a leveling plate located between the first arm and the second arm and proximate to the upper surface of the body, wherein the leveling plate is connected to the body using one or more leveling screws to allow the leveling plate to move independently of the body along a Z-axis relative to the upper surface of the body.

2. The system of claim 1, wherein the alarm switch is integrated with the leveling plate.

3. The system of claim 1, wherein the alarm switch is a plunger-style sensor.

4. The system of claim 1, wherein the draw pin is operable with a tool.

5. The system of claim 1, wherein the security device further comprises a security pin at a tip of one of the first threaded end and second threaded end of the draw pin.

6. The system of claim 1, further comprising:
    a main terminal comprising a first charging voltage bus for providing the first charging voltage,
a second charging voltage bus for providing the second charging voltage, and
a microprocessor for monitoring the alarm switch.

7. The system of clam 6, further comprising
a cable connecting the first charging voltage bus to the first charging port, connecting the second charging voltage bus to the second charging port, and connecting the microprocessor to the alarm switch.

8. The system of claim 6, wherein the main terminal further comprises
an alarm circuit comprising
the first charging voltage connected to a first node through a first diode, wherein the anode of the first diode is connected to the first charging voltage and the cathode of the first diode is connected to the first node,
the first node for connecting to the first charging port,
a second voltage higher than the first charging voltage connected to a second node, which is connected to the first node through a first resistor,
the first node connected to a third node through a second resistor, and
the third node connected to ground through a third resistor and connected to the microprocessor,
wherein the microprocessor is configured to monitor the voltage at the third node to determine if a charging cable is connected or has been disconnected from the first charging port or the handheld electronic device.

9. The system of claim 8, wherein the alarm circuit further comprises:
the second node connected to at fourth node through a second diode, wherein the anode of the second diode is connected to the second node and the cathode of the second diode is connected to a fourth node,
the fourth node for connecting to the second charging port,
a third voltage higher than the second charging voltage connected to the fourth node through a fourth resistor,
the fourth node connected to a fifth node through a fifth resistor, and
the fifth node connected to ground through a sixth resistor and connected to the microprocessor,
wherein the microprocessor is configured to monitor the voltage at the fifth node to determine if as charging cable is connected or has been disconnected from the second charging port or the handheld electronic device.

10. The system of claim 8, wherein the second voltage is the second charging voltage.

11. The system of claim 8, wherein the first diode is a Schottky diode.

12. A system for securing handheld electronic devices of different charging voltages, the system comprising:
a main terminal comprising
a first charging voltage bus for providing a first charging voltage,
a second charging voltage bus for providing a second charging voltage, and
a microprocessor for monitoring an alarm switch; and
an alarm circuit comprising
the first charging voltage connected to a first node through a first diode, wherein the anode of the first diode is connected to the first charging voltage and the cathode of the first diode is connected to the first node,
the first node for connecting to a first charging port,
a second voltage higher than the first charging voltage connected to a second node, which is connected to the first node through a first resistor,
the first node connected to a third node through a second resistor, and
the third node connected to ground through a third resistor and connected to the microprocessor,
wherein the microprocessor is configured to monitor the voltage at the third node to determine if a charging cable is connected or has been disconnected from the first charging port or the handheld electronic device.

13. The system of claim 12, wherein the alarm circuit further comprises:
the second node connected to a fourth node through a second diode, wherein the anode of the second diode is connected to the second node and the cathode of the second diode is connected to a fourth node,
the fourth node for connecting to a second charging port,
a third voltage higher than the second charging voltage connected to the fourth node through a fourth resistor,
the fourth node connected to a fifth node through a fifth resistor, and
the fifth node connected to ground through a sixth resistor and connected to the microprocessor,
wherein the microprocessor is configured to monitor the voltage at the fifth node to determine if a charging cable is connected or has been disconnected.

\* \* \* \* \*